(12) United States Patent
Taketsuna et al.

(10) Patent No.: US 7,128,685 B2
(45) Date of Patent: Oct. 31, 2006

(54) TOROIDAL TYPE CONTINUOUSLY VARIABLE TRANSMISSION

(75) Inventors: Yasuji Taketsuna, Okazaki (JP); Shigenori Tamaki, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 154 days.

(21) Appl. No.: 10/450,259

(22) PCT Filed: Dec. 21, 2001

(86) PCT No.: PCT/JP01/11260

§ 371 (c)(1),
(2), (4) Date: Jun. 12, 2003

(87) PCT Pub. No.: WO02/053947

PCT Pub. Date: Jul. 11, 2002

(65) Prior Publication Data

US 2004/0029676 A1    Feb. 12, 2004

(30) Foreign Application Priority Data

Dec. 28, 2000    (JP) ............................. 2000-402234

(51) Int. Cl.
*F16H 15/38*    (2006.01)
(52) U.S. Cl. ............................ 476/10; 476/40; 476/42
(58) Field of Classification Search ................ 74/7–10, 74/40, 42, 46; 477/98, 37, 43
See application file for complete search history.

(56) References Cited

U.S. PATENT DOCUMENTS

| | | | | |
|---|---|---|---|---|
| 5,643,132 A | * | 7/1997 | Inoue | 476/10 |
| 5,971,886 A | * | 10/1999 | Yamamoto | 476/10 |
| 5,984,829 A | | 11/1999 | Minagawa et al. | |
| 6,162,144 A | * | 12/2000 | Haka | 476/10 |
| 6,682,457 B1 | * | 1/2004 | Yoshida et al. | 476/7 |

FOREIGN PATENT DOCUMENTS

| | | |
|---|---|---|
| JP | A 6-74317 | 3/1994 |
| JP | A 6-174030 | 6/1994 |
| JP | A 8-28646 | 2/1996 |
| JP | A 09-229152 | 9/1997 |
| JP | A 10-132066 | 5/1998 |
| JP | 10-281269 | * 10/1998 |

* cited by examiner

Primary Examiner—William C. Joyce
(74) Attorney, Agent, or Firm—Oliff & Berridge, PLC

(57) ABSTRACT

A toroidal type continuously variable transmission; in which a rolling member for mediating the transmission of a torque is clamped between at least a pair of rotary members; and in which a clamping force for clamping the rolling member in the direction not to let the rolling member be released from between the rotary members is applied to the rolling member, comprises: a detector for detecting temperature rise of either, a temperature of a rolling face of the rotary members for clamping the rolling member, or a temperature of the rolling member; and a rolling member controller for reducing the clamping force in case a temperature rise is detected by said detector.

8 Claims, 5 Drawing Sheets

TOROIDAL TYPE CONTINUOUSLY VARIABLE TRANSMISSION

TECHNICAL FIELD

This invention relates to a toroidal type (or traction type) continuously variable transmission which is constructed to vary the gear ratio continuously by means of varying the torque transmitting point between the rolling member and the rotary member in the radial direction, with clamping a rolling member between a pair of rotary members to transmit a torque from one of the rotary member to the other rotary member through the rolling member by rotating one of the rotary member.

BACKGROUND ART

A continuously variable transmission of this kind is constructed with, e.g., clamping a disc-shaped roller between a pair of discs arranged opposed to each other. The portion of the pair of discs where the outer side from a predetermined radius has an arcuate plane congruent with the arc centered on the center point of opposed planes of those discs, and such arcuate plane is leading to circumferential direction. The plane thus incurved three-dimensionally is a toroidal plane. The toroidal plane functions as a rolling face and the roller is clamped therebetween. The roller is a disc-shaped member and its sectional figure along in-depth direction of the outer circumferential portion is congruent with the arcuate figure of the rolling face of the discs. Accordingly, the roller is rotated by means of rotating one of the discs, and the other disc rotates sequentially. Then, the roller is inclined to move the radial position of the contact portion against one of the discs, i.e., the radial position from the center axis of the disc outward, and also to move the radial position of the contact portion against the other disc to inner circumferential side, so that the speed change ratio corresponding to the proportion of the radii of each contact portions is thereby set.

The amount of the torque to be transmitted by the continuously variable transmission of this kind is varied in accordance with the load to clamp the roller by the discs. The bigger so-called clamping force of the discs for clamping the roller becomes, the more the transmittable torque increases consequently. On the other hand, in case of the full toroidal type continuously variable transmission for example, it is constructed to execute speed change with acting the inclining force on the rollers by moving the rollers backward and forward on the plane in parallel with the center axis of rotation of the discs. Accordingly, in the toroidal type continuously variable transmission of this kind, the load is acted in the direction that the roller is released from between the discs by the clamping pressure of discs; therefore, the load to counteract against such load is acted as the holding force in order to hold the roller at the predetermined position between the discs. Namely, it is constructed to ensure predetermined torque transmitting capacity with balancing the clamping force of the discs and holding force for the roller.

In the toroidal type continuously variable transmission, a heavy load is acted on the contacting boundary face between the disc and the roller as mentioned above, therefore, in the prior art, an oil film is formed between the disc and the roller in order to prevent abrasion or deformation due to direct contact between the disc and the roller, and the torque is transmitted with utilizing a shearing force of the oil film. However, the oil film is restricted in its function according to the temperature, therefore, there is a possibility for the oil film to be broken and causes the direct contact between the disc and the roller.

In this connection, according to the invention disclosed in Japanese Patent Laid-Open 9-229152, therefore, the construction is made to restrict the range of movement of the roller based on the temperature of the traction oil for forming the oil film. Namely, the shearing force acts on the oil film becomes bigger if the radius of the contact position of the roller against the discs is small in comparison with the case that such radius is big, and breakage of the oil film is easy to be occurred. Therefore, the inclining range of the roller (range of movement) is restricted based on the temperature of the traction oil, in order not to let the radius of contact position of the roller against both input and output discs become small. Accordingly, relative excess of the shearing force acts on the oil film, and breakage of the oil film arising from such are thereby prevented.

According to the invention disclosed in the aforementioned Laid-Open, the temperature rise of the oil is suppressed if the energy inputted to the continuously variable transmission is not changed, because the shearing force acts on the oil film is restricted. However, the oil temperature is not exactly lowered in case of the energy to be transmitted by the continuously variable transmission is not changed, even if the temperature rise of the oil is suppressed. The oil temperature rises gradually in case of that the energy acts on the continuously variable transmission is relatively big, and there is a possibility of occurring the breakage of the oil film in the end. Aforementioned continuously variable transmission according to the prior art cannot cope with such problem, therefore, there is a possibility of occurring breakage of oil film, and damaging of discs and rollers arising from such breakage of the oil film.

This invention has been made in the view of the aforementioned technical problem, and its object is to provide a toroidal type continuously variable transmission, which can avoid to cause mechanical damage with preventing the temperature rise to exceed a predetermined temperature at the contacting boundary face between the rotary members such as discs or the like and the rolling members such as rollers or the like held by the rotary members, or at the lubricating oil for forming the oil film on the contacting boundary face.

DISCLOSURE OF THE INVENTION

In order to achieve the aforementioned object, the present invention is characterized by being constructed to restrict energy to be transmitted by the continuously variable transmission based on a detected temperature. According to the present invention, more specifically, there is provided a toroidal type continuously variable transmission; in which a rolling member for mediating transmission of a torque is clamped between at least a pair of rotary members; and in which a holding force for holding said rolling member in the direction not to let said rolling member be released from between said rotary members is applied to said rolling members, with counteracting a load of said rotary members for clamping said rolling member; is characterized by comprising: a detector for detecting a temperature rise of either; a temperature of a rolling face of said rotary member for clamping said rolling member; or a temperature of said rolling member; and a rolling member controller for reducing the holding force in case the temperature rise is detected by the detector.

According to the present invention, therefore, the holding force for holding the rolling members between the rotary members is reduced when the temperature rise of the rolling faces of the rotary members, or the temperature rise of the rolling members is detected. The rotary members clamp the rolling member, and the holding force acting on the rolling member is the force for holding the rolling member between the rotary members with counteracting a load of the rotary members for clamping the rolling members. Therefore, a contact pressure (or a contact pressure through the oil film) of the rotary members and the rolling member is decreased when the holding force is reduced. Consequently, the amount of energy to be transmitted by the continuously variable transmission is reduced, and a temperature rise is thereby prevented.

According to the present invention, moreover, there is provided a toroidal type continuously variable transmission; in which a rolling member for mediating the transmission of a torque is clamped between at least a pair of rotary members; and in which a holding force for holding said rolling member in the direction not to let said rolling member be released from between said rotary members is applied to said rolling member, with counteracting a load of said rotary members for clamping said rolling member; and in which lubricating oil is fed between said rotary members and the rolling member, is characterized by comprising: a detector for detecting a temperature rise of either; a temperature of a rolling face of said rotary member for clamping said rolling member; or a temperature of the rolling member; a lubricating device for increasing the feeding amount of the lubricating oil in case that the temperature rise is detected by the detector; and the rolling member controller for reducing the clamping force in case that the detector detects the temperature rise after the feeding amount of the lubricating oil is increased.

According to the present invention, therefore, the feeding amount of the lubricating oil between the rotary members and the rolling member is increased when a temperature rise of the rolling face of the rotary member, or a temperature rise of the rolling members is detected. Cooling action of the lubricating oil is enhanced in connection with such procedure, however, the holding force for holding the rolling member between the rotary members is reduced when further temperature rise is nevertheless detected. The rotary members clamp the rolling member, and the holding force acting on the rolling member is the force for holding the rolling member between the rotary members with counteracting a load of the rotary members for clamping the rolling member. Therefore, the contact pressure between the rotary members and the rolling member through the oil film is decreased when the holding force is reduced. Consequently, the amount of energy to be transmitted by the continuously variable transmission is reduced, and the temperature rise is thereby prevented.

Besides, the detector according to the present invention may be constructed to detect a temperature rise in accordance with any of: a temperature of the rolling face, a temperature of lubricating oil for lubricating the rolling face, or a difference between input energy and output energy of the continuously variable transmission.

Also, the rolling member controller according to the present invention may be a mechanism for controlling a differential pressure between a forward pressure and a reverse pressure of a hydraulic type actuator for moving the rolling member backward and forward.

BEST MODE FOR CARRYING OUT THE INVENTION

Figure 1:
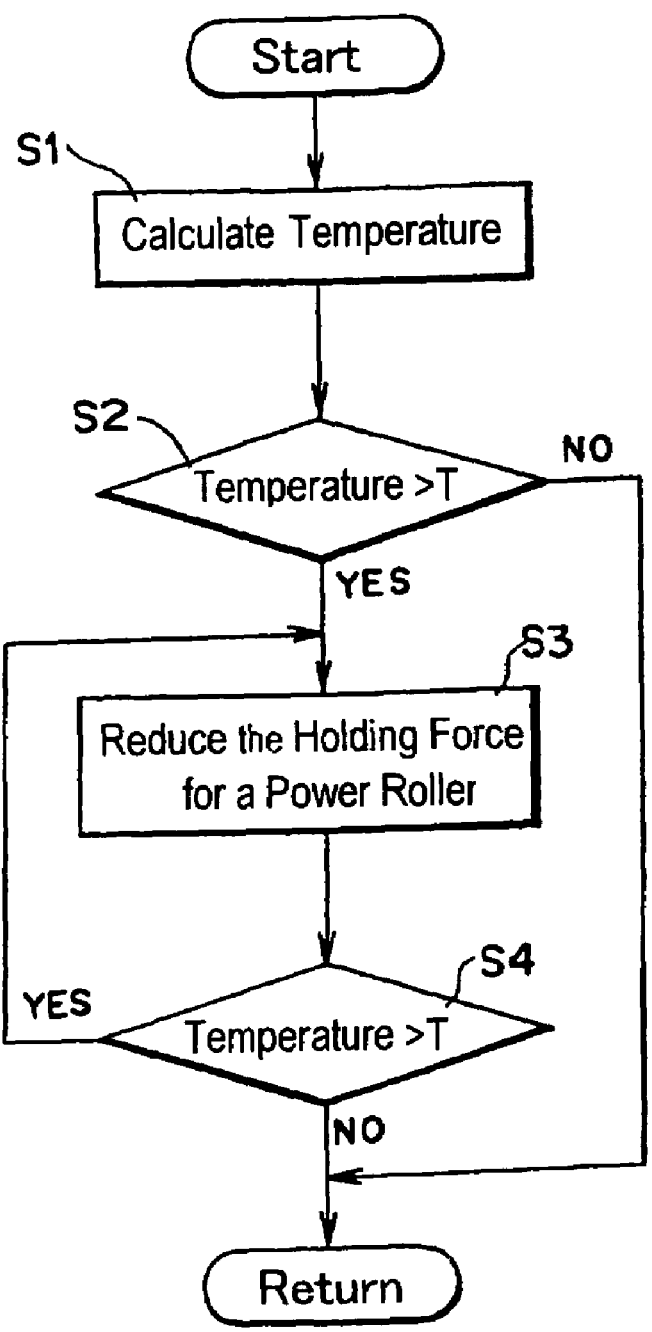
FIG. 1 is a flowchart describing an example of control executed in a continuously variable transmission according to this invention.

Next, this invention will be described in connection with a specific embodiment shown in the drawings. First of all, to describe one example of a continuously variable transmission subjected to this invention, a double cavity type full toroidal type continuously variable transmission 1 is depicted typically in FIG. 3. In the toroidal type continuously variable transmission 1, a pair of input discs 2 are arranged in so-called back-to-back relation each other, and a pair of output discs 3 are arranged to be opposed to those input discs 2, namely, with sandwiching those input discs 2.

Figure 3:
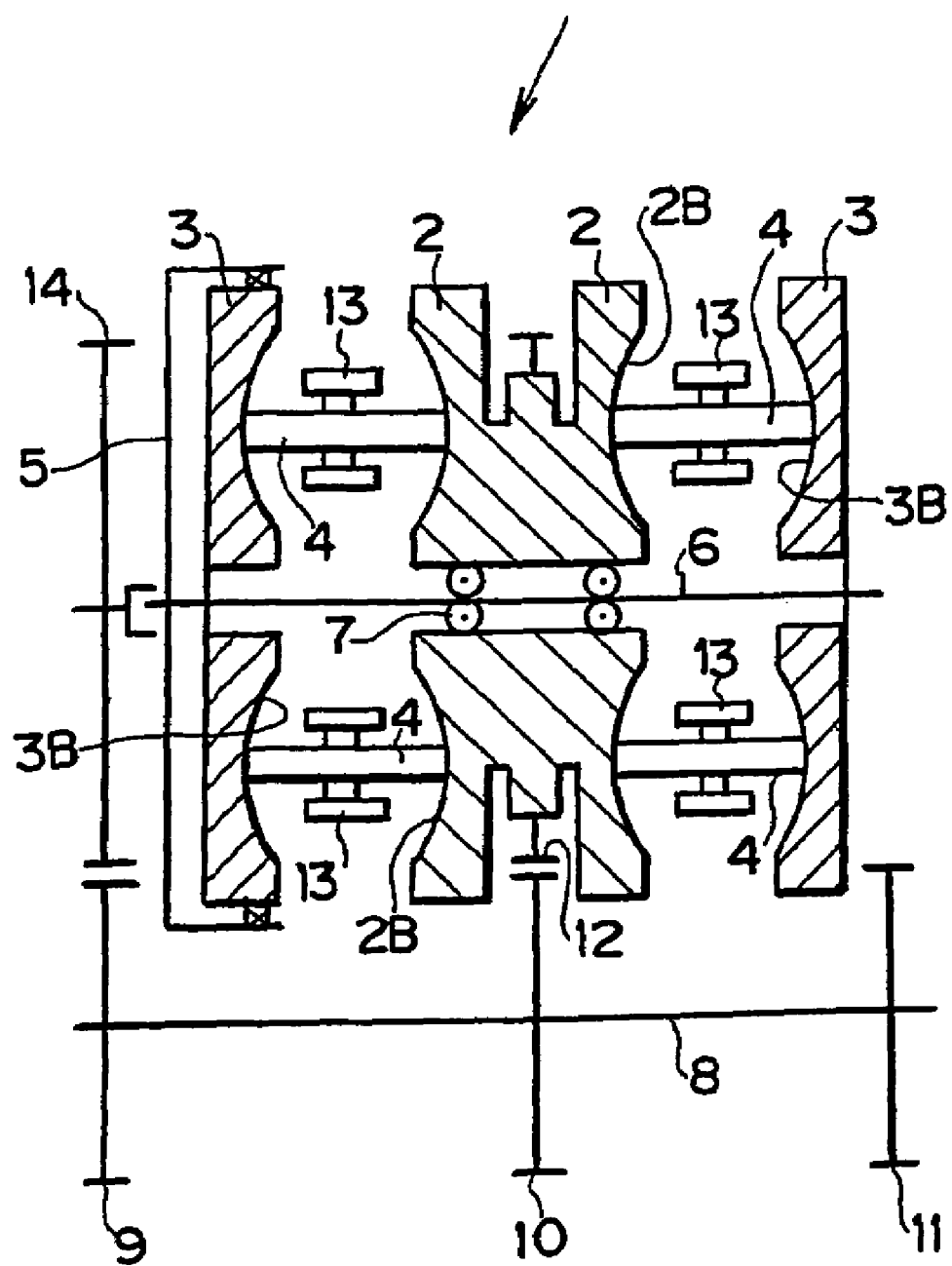
FIG. 3 is a typical side sectional view showing one example of entire construction of the continuously variable transmission according to this invention.

Those discs 2 and 3 are made such that portions of their opposed faces on an outer circumference side from a predetermined radius are shaped, as cut in a plane on the center axis, to have a section of an arcuate plane of a predetermined radius, likewise the discs of the toroidal type continuously variable transmission according to the prior art. And a power roller (a rolling member) 4, which corresponds to an idling member or a transmission member, is sandwiched therebetween. That is, the output disc 3 in the right hand side of FIG. 3 is fixed in the axial direction, and a hydraulic chamber 5 is arranged in the backside (opposite side of the rolling face) of the output disc 3 in the left hand side. And the power roller 4 is clamped by each of the input disc 2 and the output disc 3 by means of feeding the oil pressure according to the torque to be transmitted to the hydraulic chamber 5. Namely, it is constructed to generate the clamping force for clamping the power roller 4 by each discs 2 and 3 from the oil pressure to be fed to the hydraulic chamber 5.

Here, each output discs 3 is connected to rotate integrally by an output shaft 6 arranged along the center axis of those discs, and the output shaft 6 penetrates center portions of each input discs 2. Also, a bearing 7 is arranged between each input discs 2 and output shaft 6, and those input discs 2 and output shaft 6 are constructed to rotate relatively.

Also, an input shaft 8 is arranged rotatably in parallel with the output shaft 6. The input shaft 8 is slightly longer than the entire length of the continuously variable transmission 1, and gears 9, 10 and 11 are installed on three places in total such as its both front and rear end portions, and its intermediate portion. The gear 10 at the intermediate portion is engaged with a gear 12 integrated with said each input discs 2. Accordingly, the torque is inputted to the continuously variable transmission 1 from the input shaft 8 through those gears 10 and 12.

Moreover, said power roller 4 is a disc-shaped member, and the outer circumference of which has a sectional shape formed into a curved face with the curvature equal to the arc of the rolling face of each discs 2 and 3. As the power roller 4 is inclined with respect to the individual discs 2 and 3, therefore, radial portions of the contact portions between the power roller 4 and the discs 2 and 3 are arbitrarily changed. Three power rollers 4 are arranged between each input disc 2 and output disc 3 at even intervals, and six power rollers are provided all together for the continuously variable transmission 1 as a whole.

Furthermore, each power roller 4 is held rotatably and inclinably by a carriage 13 which functions as a holding member. This carriage 13 has a lubricating oil passage formed for feeding the lubricating oil to the outer circumferential face of the power roller 4, as mentioned below.

Besides, an input gear 14 engaged with the gear 9 installed on the input shaft 8 is provided, and the input gear 14 is rotated by motive energy of a power source such as an engine (not shown).

Figure 4:
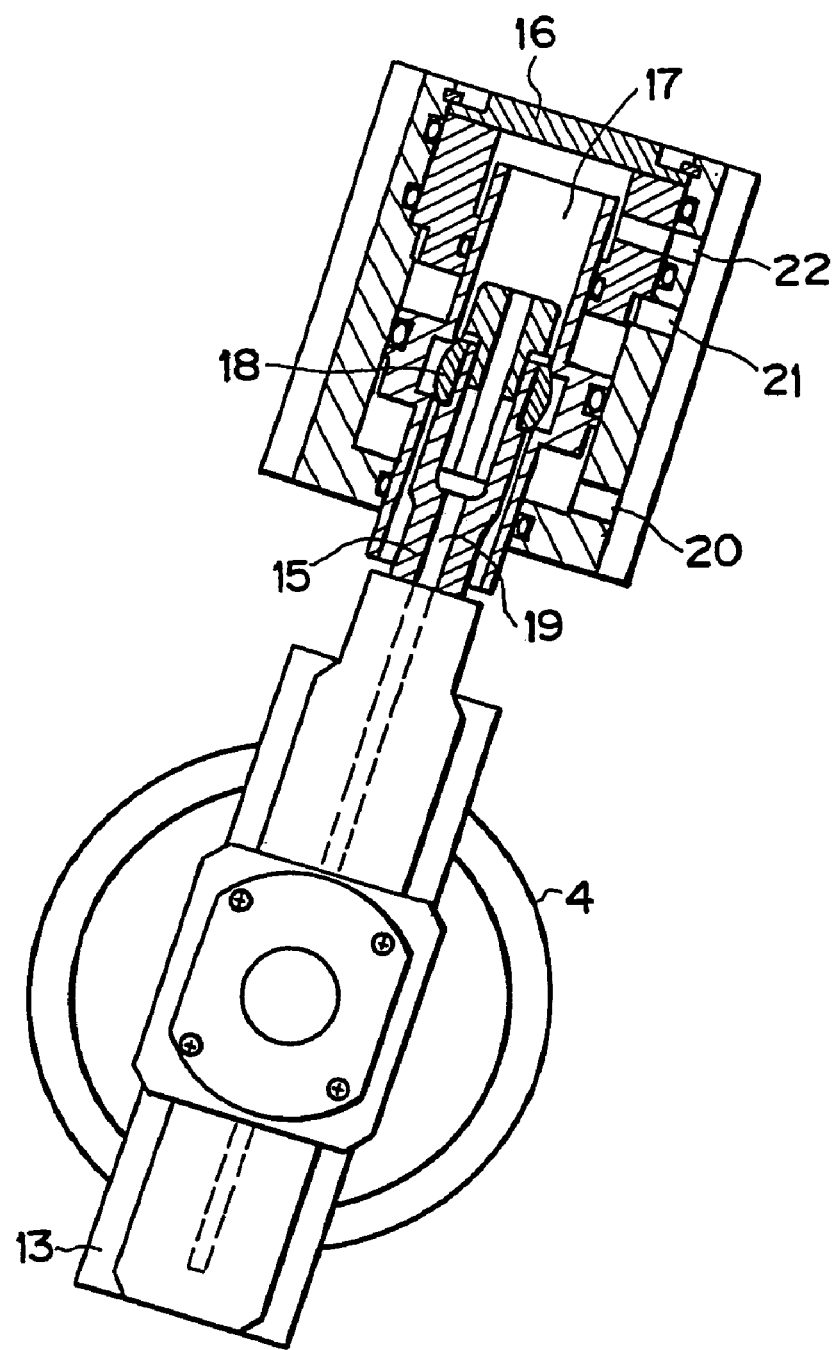
FIG. 4 is a partial sectional view showing one example of a mechanism for holding a power roller.

Said power roller 4 is constructed to move backward and forward together with the carriage 13 on the plane which is in parallel with the center axis of the rotation of the output shaft 6 (center axis of the rotation of each discs 2 and 3), and to incline against the center axis of the rotation of the output shaft 6 in connection with such moving of backward and forward. One example of the mechanism for that purpose is depicted in FIG. 4. The carriage 13, which is constructed of two plate shaped portions upper and lower for holding the power roller 4 with clamping, holds a shaft arranged on the center portions of the power roller 4 protruding to both directions upward and downward rotatably. A shaft portion 15 provided on one of the end portions of the carriage 13 in a longitudinal direction is connected to a piston rod 17 of a linear acting type hydraulic cylinder 16 through a ball joint 18.

Namely, the piston rod 17 of the hydraulic cylinder 16 is a hollow cylindrical shaft member integrated with the piston, as depicted in FIG. 4, and the shaft portion 15 is inserted therein. Also, the shaft portion 15 and the piston rod 17 are connected oscillatably through the ball joint 18 fitted on outer circumferential portion of the shaft portion 15.

A lubricating oil passage 19 is formed along the center axis of the shaft portion 15 which is integrated with the carriage 13. The function of the lubricating oil passage 19 is feeding the lubricating oil to the outer circumferential face of the power roller 4, and it opens to the position opposed to outer circumferential face of the power roller 4 in the carriage 13. Also, the rear end portion of the lubricating oil passage 19 is communicated with the hollow portion of the rear end side of the hydraulic cylinder 16, likewise the piston rod 17. On the predetermined portion of exterior wall face of the hydraulic cylinder 16, there are formed a reverse port 20 for feeding oil pressure to draw the piston backward, a forward port 21 for feeding oil pressure to forward the piston, and a lubrication port 22 for feeding lubricating oil to the lubricating oil passage 19.

Figure 5:
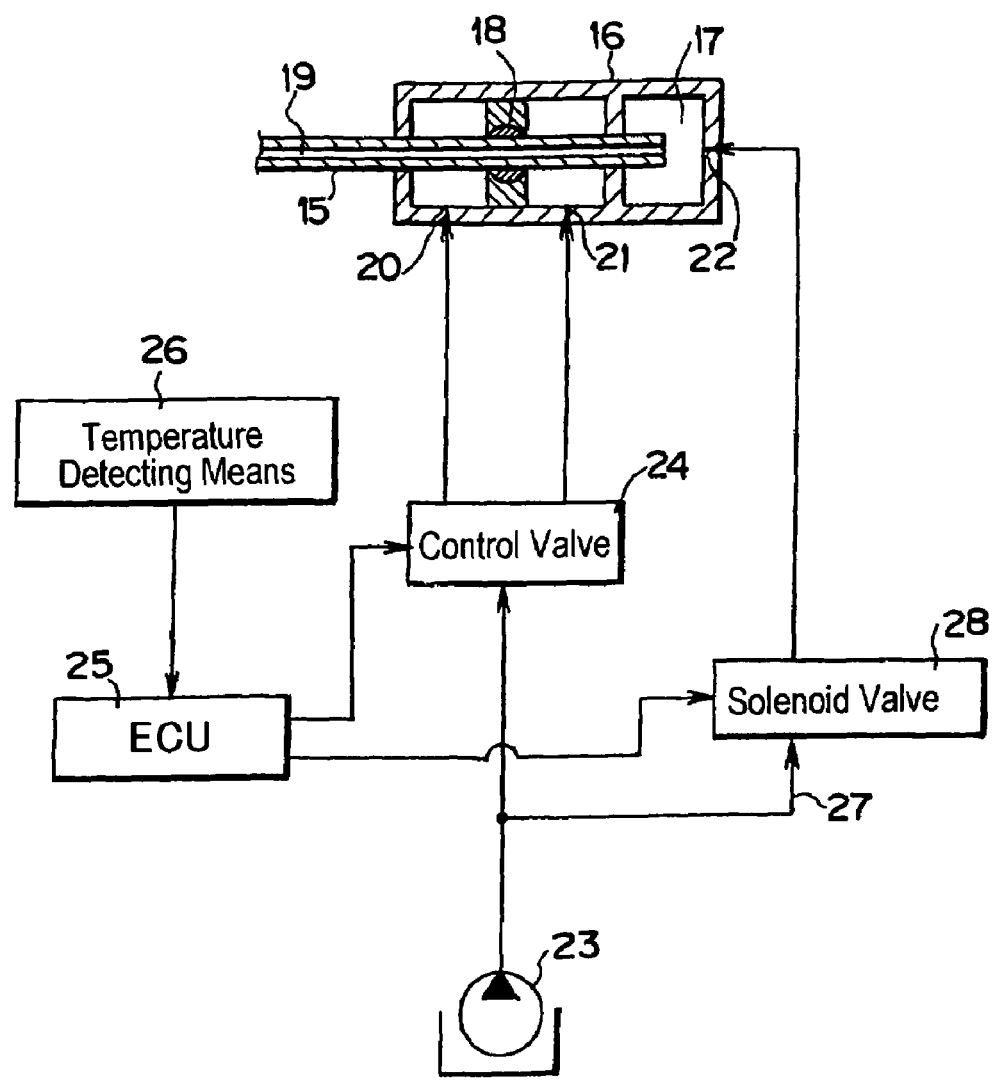
FIG. 5 is a pattern diagram showing one example of an oil circuit for setting a holding force for power rollers, and for feeding lubricating oil.

A hydraulic circuit for controlling the oil pressure to be fed to the hydraulic cylinder 16 will be described hereafter. In FIG. 5, there is provided a control valve 24 for feeding an oil pressure which is pressurized and regulated by a hydraulic pump 23, to the reverse port 20 and forward port 21 of the hydraulic cylinder 16 alternatively. This control valve 24 is controlled electrically, and constructed to move the power roller 4 together with the carriage 13 backward and forward by regulating the differential pressure between the oil pressure to be fed to the reverse port 20 and the oil pressure to be fed to the forward port 21, thereby to hold the power rollers 4 at the predetermined position on the plane in parallel with the center axis of rotation of each discs 2 and 3. The thrust thus generated from the hydraulic cylinder 16 is the holding force for the power rollers 4, and is kept as the amount to counteract the load generated from the clamping force of the input disc 2 and the output disc 3.

An electronic control unit (ECU) 25 for controlling the control valve 24 is provided. The electronic control unit 25 is constructed mainly of a microcomputer, and controls the control valve 24 based on the calculation result of the differential pressure of the oil pressure to be fed to the reverse port 20 and the forward port 21, obtained by the calculation in accordance with inputted data, and previously stored data and programs. More specifically, speed change ratio is set as a predetermined value by inclining the power roller 4 in accordance with the movement of the power roller 4 backward and forward.

Also, the holding force for the power roller 4 is the force to counteract the load based on the clamping force of each discs 2 and 3 for the power rollers 4, therefore, facial pressure between each discs 2, 3 and the power roller 4 is decreased and the transmittable torque is reduced when the holding force is reduced. In this connection, the electronic control unit 25 is constructed to control the control valve 24 in order to restrict the transfer torque to be allowed. That is, the signal from a temperature detecting means 26 is inputted to the electronic control unit 25.

The temperature detecting means 26 is a means for detecting temperatures of rolling faces 2B and 3B of the discs 2 and 3, and a means for obtaining the temperature by calculation may also be employed instead of the means for detecting the temperature of the rolling faces 2B and 3B directly. For example: a means for calculating the temperatures of the rolling faces 2B and 3B with detecting a temperature of the lubricating oil which returns to an oil pan (not shown) such as an oil reservoir or the like, so as to calculate based on the detected temperature; or a means for calculating temperatures of the rolling faces 2B and 3B based on the heat energy and the amount of heat release, or heat capacity of the continuously variable transmission 1 or the like, by means of obtaining the energy converted to the heat by the continuously variable transmission 1 in accordance with the difference between the input energy and the output energy, with calculating the energy inputted to the continuously variable transmission 1 based on the revolutions or the air suction amount of the engine as a power source, and with calculating the output energy of the continuously variable transmission 1 based on the revolutions or the output torque of the output shaft 6; are also available to be employed.

And the electronic control device 24 is constructed to reduce the transfer torque (transfer energy) at the continuously variable transmission 1 by reducing the holding force for the power roller 4, when the temperature detected by the temperature detecting means 26 is high.

As shown in FIG. 5, it is constructed also to feed the oil pressure, which is discharged from a hydraulic pump 23 and regulated as the predetermined pressure, to a lubricating port 22 of the hydraulic cylinder 16. A solenoid valve 28 for regulating the flow rate of the lubricating oil is interposed in the midstream of an oil passage 27. And this solenoid valve 28 is controlled by the electronic control unit 25.

In the aforementioned continuously variable transmission 1, the torque is transmitted to the input disc 2 by means of rotating an input gear 14 by the not shown power source such as the engine or the like, through the gear 9 engaged with the input gear 14 and the input shaft 8. The power roller 4 contacting with the rolling face 2B through the oil film is rotated when the input disc 2 rotates, and the output disc 3 is rotated subsequently, because the power roller 4 contacts with the rolling face 3B of the output disc 3 through the oil film. As a result, the output shaft 6 integrated with the output disc 3 is therefore rotated.

In this case, the number of revolutions of the power roller 4 is determined depend on the number of revolutions of the input disc 2 and the radius from the center of rotation at the contact portion with its rolling face 2B. Also, the number of revolutions of the output disc 3 is determined depend on the number of revolutions of the power roller 4 and the radius from the center of rotation at the contact portion of the power roller 4 with the rolling face 3B. Accordingly, the number of relative rotations of the output disc 3 to the input disc 2 is determined in connection with the radial positions of the contact portions of the power roller 4 against each rolling faces 2B and 3B, and speed change ratio is changed continuously by means of varying the contact portions of the power roller 4 against each rolling faces 2B and 3B by inclining the power roller 4 to the center axis of the output shaft 6.

Transmission of the torque among each of the discs 2 and 3 and the power roller 4 is executed through the shearing force of the oil film formed therebetween, and the lubricating oil for forming the oil film is fed to an outer circumferential face of each discs 2 and 3 from said carriage 13. Also, the power roller 4 is clamped by the thrust force applied to the discs 2 and 3 in response to the torque to be transmitted. Accordingly, a strong compressive force and the shearing force act on the oil film, therefore, the heat is generated in connection with transmitting the torque. The heat is released to the atmosphere, and also carried away by the lubricating oil, and the continuously variable transmission 1 is thus cooled down. However, if the heat is generated enough to exceed the cooling action, it is controlled as described hereinafter.

FIG. 1 shows the control example, and the temperature is calculated first of all (Step S1). It is executed by said temperature detecting means 26 or the electronic control unit 25 based on the detection signal of the temperature detecting means 26. For one example of such calculation, as mentioned above, the amount of heat generated at the continuously variable transmission 1 is obtained in accordance with the difference between the input energy to the continuously variable transmission 1 and the energy outputted from the continuously variable transmission 1, then the temperature is calculated based on the amount of heat.

It is decided whether or not the calculated temperature is higher than the criterion value T set in advance or not (Step S2). The criterion value T is the temperature within the range which is not mechanically damage the continuously variable transmission 1, i.e., the temperature which is slightly lower than the upper limit to break the oil film, and may be obtained in advance from an experimentation or the like.

If the answer of the Step S2 is NO, the routine is returned without executing any special control. On the contrary, if the answer of the Step S2 is YES, the holding force for the power roller 4 is reduced (Step S3). Specifically, the differential pressure of the oil pressure to be fed to each ports 20 and 21 is set to reduce the pressing force when the hydraulic cylinder 16 is generating the pressing force for holding the power rollers 4 between each discs 2 and 3, and to reduce the pulling force when the hydraulic cylinder is generating the pulling force.

When the holding force for the power roller 4 is thus reduced, the facial pressure at the contact portion between each discs 2, 3 and the power roller 4 through the oil film is reduced, and the transfer torque is reduced consequently.

Therefore, the amount of energy to be converted to the heat is decreased as a result of diminish in the shearing action to the oil film and so on, and the heat evolution is suppressed. Then, it is decided once again whether or not the temperature detected under such condition is higher than the criterion value T (Step S4).

If the answer of the Step S4 is YES, it means that the heating amount is still large even if the transfer torque is reduced and the temperature is still rising, therefore, the routine is returned to the Step S3 and the holding force for the power roller 4 is further reduced. On the contrary, if the answer of Step S4 is NO, it means that the amount of energy to be converted to the heat is reduced and the temperature starts falling, therefore, the routine is returned.

According to the control as shown in FIG. 1, the heating amount is reduced instead of enhancing the cooling capacity when the temperature rises, so that the temperature rise is certainly prevented. As a result, breakage of the oil film, and direct contact between discs 2, 3 and the power roller 4 resulting from such breakage is avoided, so that the mechanical damage such as abrasion and deformation of the discs 2 and 3 or the power roller 4 is prevented from occurring in advance.

Besides, in the present invention, an operation for enhancing cooling capacity may be employed concomitantly, in addition to reduce the heating amount as mentioned above. One example is shown in a flowchart of FIG. 2. The example shown therein is constructed to augment the feeding amount of the lubricating oil prior to reduce the holding force for the power roller 4. Namely, the feeding amount of the lubricating oil is augmented when it is decided that the temperature calculated at Step S1 is higher than the criterion value T (Step S21). That is, in particular, said solenoid valve 28 is controlled by the electric control unit 25 to augment the amount of the lubricating oil which flows through the oil passage 27. Consequently, the heat is drawn as a result of augmentation of the lubricating oil to be fed between the power roller 4 and the discs 2, 3 from the carriage 13, so that aggressive cooling action is generated accordingly.

After the lubricating oil is thus augmented, it is decided whether or not the calculated temperature is higher than the criterion value T (Step S22), and if the answer is NO, the routine is returned without executing any specific operation. Accordingly, in this case, the output torque can be kept sufficiently according to the necessity without reducing the transmission capacity of torque, because the holding force for the power roller 4 is maintained as before.

On the contrary, if the answer of Step S22 is YES for the reason of excessive temperature in spite of augmenting the lubricating oil, the routine advances to Step S3 and the holding force for the power roller 4 is reduced. Subsequent control is same as above mentioned control shown in FIG. 1.

Figure 2:
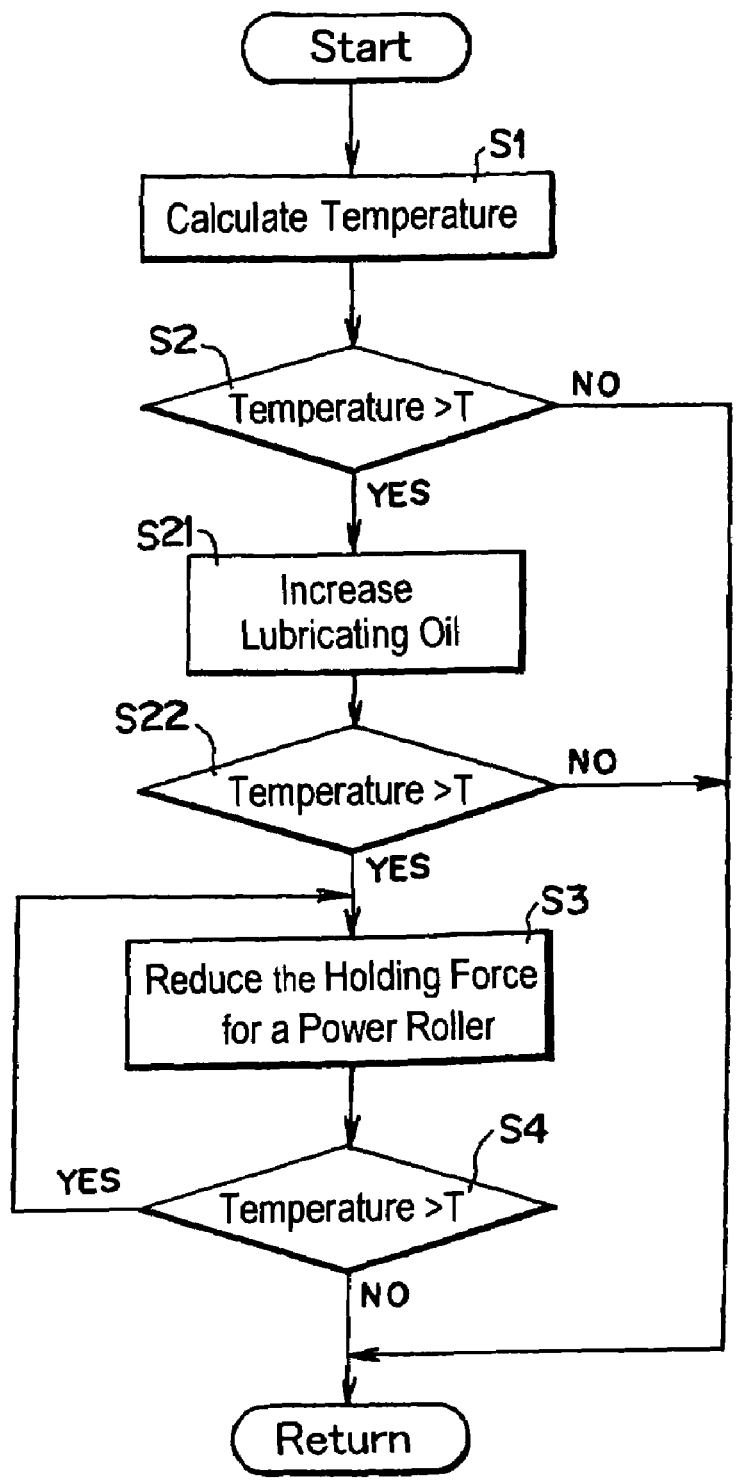
FIG. 2 is a flowchart describing another example of control executed in the continuously variable transmission according to this invention.

According to the control as shown in FIG. 2, therefore, the output torque is not reduced immediately, because the cooling action is enhanced first of all when the temperature rises; and the heating amount is reduced when the status becomes impossible to lower the temperature by cooling; therefore, mechanical damage on the continuously variable transmission 1 is prevented in advance.

The relation between said embodiment and the present invention will be described briefly hereinafter. Aforementioned temperature detecting means 26 or the device for executing Step S1 as shown in FIG. 1 and 2 correspond to the detector of the present invention. Also, the hydraulic cylinder 16, the control valve 24, the electric control unit 25, and the device for executing Step S3 as shown in FIG. 1 and 2 correspond to the rolling member controller of the present invention. And the solenoid valve 27 and the device for executing Step S21 as shown in FIG. 2 correspond to the lubricating device of the present invention.

Here, this invention should not be limited to the specific embodiments thus far described, but it may be applied not only to a full toroidal type continuously variable transmission, but also to a half toroidal type continuously variable transmission. Accordingly, concerning the reduction of the holding force for the rolling member, that is to say, it is sufficient to reduce the holding force in the direction that the rolling member gets out of between the rotary members such as discs. Also, concerning the feeding of the lubricating oil for cooling, it may be constructed to feed the lubricating oil directly to the rolling face, other than feeding from the carriage. Moreover, the control valve for controlling the holding force may be constructed of a plurality of valves as a pressure regulating mechanism, instead of single valve.

Here will be synthetically described the advantages to be attained by this invention. According to the present invention, as has been described hereinbefore, the contacting pressure between the rotary members and the rolling member (or the contact pressure through the oil film) is reduced because the holding force for holding the rolling member between the rotary members is reduced when the temperature rise of the rolling face of the rotary members or the rolling member is detected. As a result, heating amount of the continuously variable transmission is reduced and the temperature rise is prevented, so that the problems such as breakage of oil film and occurring of abrasion or deformation in consequence of direct contact between the rotary members and the rolling member due to the breakage of the oil film are prevented from occurring, and mechanical damage of the continuously variable transmission is thereby prevented.

Moreover, according to the present invention, feeding amount of the lubricating oil between the rotary members and the rolling member is augmented when the temperature rise of the rolling face of the rotary members or the rolling members is detected, and the cooling action of the lubricating oil is thereby augmented, therefore, reduction of transmittable torque is inhibited. Furthermore, the holding force for holding the rolling member between the rotary members is reduced when temperature rise is detected even if under such condition, therefore, the contacting pressure between the rotary members and the rolling members is reduced. As a result, heating amount of the continuously variable transmission is reduced and temperature rise is prevented; therefore, disadvantages such as breakage of oil film, and occurring of abrasion or deformation resulted from direct contact between the rotary members and the rolling members due to such breakage are avoided, and accordingly, mechanical damage of the continuously variable transmission is prevented.

INDUSTRIAL APPLICABILITY

This invention can be utilized in the field for manufacturing the continuously variable transmission and in the field for using the continuously variable transmission. Especially, this invention can be utilized in the field relating to an automobile having the continuously variable transmission mounted thereon.

The invention claimed is:

1. A continuously variable transmission in which a rolling member for mediating transmission of a torque is clamped between at least a pair of rotary members; and in which a holding force produced by the rolling member for holding said rolling member in a direction not to release said rolling member from between said rotary members is applied to said rolling member, while counteracting a load of said rotary members for clamping said rolling member, comprising:
    a detector for detecting a temperature rise of either a temperature of a rolling face of said rotary member for clamping said rolling member, or a temperature of said rolling member; and
    a rolling member controller for reducing said holding force in case the temperature rise is detected by said detector.

2. A continuously variable transmission according to claim 1, characterized:
    in that said detector includes a device for detecting said temperature rise of the rolling face based on a temperature of lubricating oil for lubricating said rolling face; or a difference between input energy and output energy of said continuously variable transmission.

3. A continuously variable transmission according to claim 1, characterized by further comprising:
    a hydraulic type actuator for moving said rolling member backward and forward between said pair of rotary members;
    wherein said rolling member controller includes a mechanism for controlling a differential pressure between a backward pressure and a forward pressure of the actuator.

4. A continuously variable transmission in which a rolling member for mediating transmission of a torque is clamped between at least a pair of rotary members; and in which a holding force produced by the rolling member for holding said rolling member in a direction not to release said rolling member from between said rotary members is applied to said rolling member, while counteracting a load of said rotary members for clamping said rolling member, comprising:
    a controller for reducing said holding force in case of temperature rise of either a temperature of the rolling face of said rotary member for clamping said rolling member, or a temperature of said rolling member.

5. A continuously variable transmission in which a rolling member for mediating transmission of a torque is clamped between at least a pair of rotary members; in which a holding force produced by the rolling member for holding said rolling member in a direction not to release said rolling member from between said rotary members is applied to said rolling member, while counteracting a load of said rotary members for clamping said rolling member; and in which lubricating oil is fed between said rotary member and the rolling member, comprising:
    a detector for detecting a temperature rise of either a temperature of a rolling face of said rotary member for clamping said rolling member, or a temperature of said rolling member;
    a lubricating device for increasing a feeding amount of said lubricating oil in case the temperature rise is detected by said detector, and
    a rolling member controller for reducing said holding force in case said detector detects said temperature rise after the feeding amount of said lubricating oil is increased.

6. A continuously variable transmission according to claim 5, characterized:
    in that said detector includes a device for detecting said temperature rise of the rolling face based on a temperature of lubricating oil for lubricating said rolling face; or the difference between input energy and output energy of said continuously variable transmission.

7. A continuously variable transmission according to claim 5, characterized by further comprising:
   a hydraulic type actuator for moving said rolling member backward and forward between said pair of rotary members;
   wherein said rolling member controller includes a mechanism for controlling a differential pressure between a backward pressure and a forward pressure of the actuator.

8. A continuously variable transmission in which a rolling member for mediating transmission of a torque is clamped between at least a pair of rotary members; and in which a holding force produced by the rolling member for holding said rolling member in a direction not to release said rolling member from between said rotary members is applied to said rolling member, while counteracting a load of said rotary members for clamping said rolling member, comprising:
   a controller for increasing an amount of lubricating oil to be fed to said rolling face, in case of a temperature rise of either a temperature of the rolling face of said rotary member for clamping said rolling member, or a temperature of said rolling member; and for reducing said holding force in case that said temperatures rise subsequently.

\* \* \* \* \*